United States Patent [19]
Goto et al.

[11] Patent Number: 6,151,084
[45] Date of Patent: Nov. 21, 2000

[54] PANEL SHEET AND TELEVISION RECEIVER USING THE PANEL SHEET

[75] Inventors: Mitsuru Goto, Tokyo; Katsutoshi Oshima, Kanagawa, both of Japan

[73] Assignees: Sony Corporation; Nissho Corporation, both of Tokyo, Japan

[21] Appl. No.: 08/681,367

[22] Filed: Jul. 23, 1996

[30] Foreign Application Priority Data

Aug. 18, 1995 [JP] Japan .................................. P7-232066

[51] Int. Cl.[7] .................................................. H04N 5/64
[52] U.S. Cl. ............................................. 348/835; 348/836
[58] Field of Search .................................... 348/832–842

[56] References Cited

U.S. PATENT DOCUMENTS

| | | | |
|---|---|---|---|
| 3,240,876 | 3/1966 | Whitney | 178/7.9 |
| 5,455,743 | 10/1995 | Miyajima | 361/781 |
| 5,521,652 | 5/1996 | Shalvi | 348/819 |
| 5,654,778 | 8/1997 | Higuchi et al. | 348/836 |
| 5,673,090 | 9/1997 | Higuchi et al. | 348/836 |

OTHER PUBLICATIONS

Vintage Sentinel 1949 television photograph, http://newer-aantiques.com/detail.cgi?2169?photo.

*Primary Examiner*—Thomas D. Lee
*Assistant Examiner*—Stephen Brinich
*Attorney, Agent, or Firm*—Jay H. Maioli

[57] ABSTRACT

A television receiver having an integral design without spoiling the external appearance includes a panel sheet (4) on which an operation unit (6) corresponding to the operation unit arranged in the cabinet, a filter unit (7) corresponding to the light sensor unit, and a sound output unit (8) corresponding to the sound output unit which are formed integrally and is attached to the cabinet of the television receiver.

4 Claims, 4 Drawing Sheets

PANEL SHEET AND TELEVISION RECEIVER USING THE PANEL SHEET

FIELD OF THE INVENTION

This invention relates to a panel sheet and a television receiver using the panel sheet, and more particularly, is suitably applied to the panel sheet attached to a cabinet of the television receiver.

BACKGROUND OF THE INVENTION

A television receiver has an operation unit such as a power source on/off switch, a volume control switch, a channel selecting switch, a remote controller light receiving unit for receiving commands outputted from a remote controller and a sound output unit in addition to a visual image output unit for outputting visual image.

The operation unit, remote controller light receiving unit and sound output unit of the television receiver are arranged on the cabinet part of the television receiver for example.

Therefore, it is desirable that the operation unit, remote control unit and sound output unit arranged on the cabinet of television receiver be designed integrally without spoiling the external appearance of television receiver.

SUMMARY OF THE INVENTION

An object of this invention is to provide a television receiver which is designed integrally. According to this invention, the television receiver has an operation unit, an infrared ray transmissive filter unit and a panel sheet on which a sound output unit having a number of small holes for outputting sounds are formed integrally.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
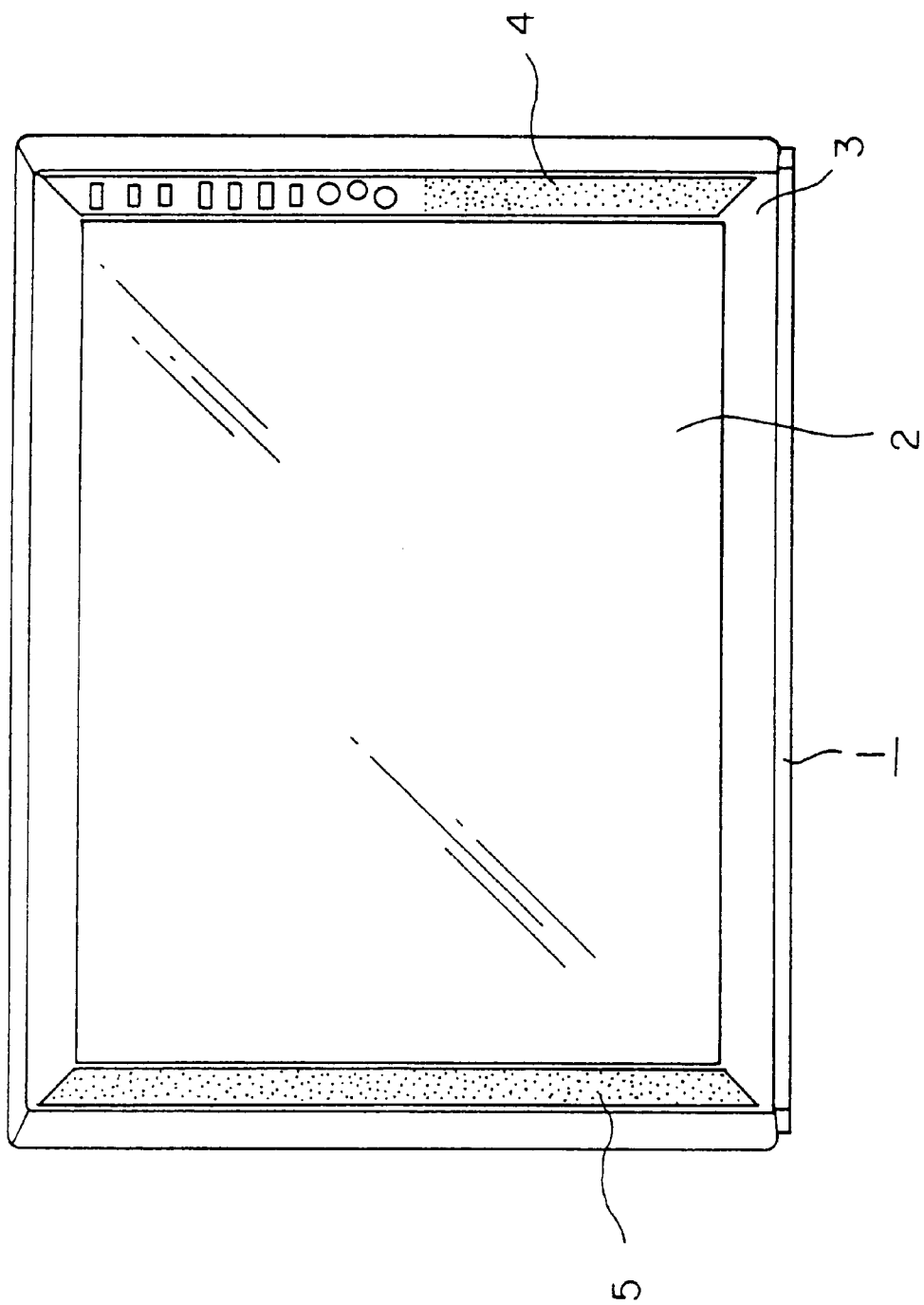
FIG. 1 is a front diagram showing a television receiver according to the embodiment of the present invention.

Preferred embodiments of this invention will be described with reference to the accompanying drawings:

FIG. 1 is a front diagram showing a television receiver according to an embodiment of the present invention.

In this figure, a television receiver 1, as well as a visual image output unit 2 is formed integrally with a front cabinet 3 (hereinafter referred to as cabinet), a panel sheet 4 is attached to the right side face of the cabinet 3, and a panel sheet 5 is attached to the left side face, for example. Also, an operation switch, a light emitting and light receiving device, and a sound output device are provided on the part of cabinet 3 on which the panel sheet 4 is attached (not shown) and the sound output device is provided on the part of cabinet 3 on which the panel sheet 5 is attached (not shown).

Figure 2:
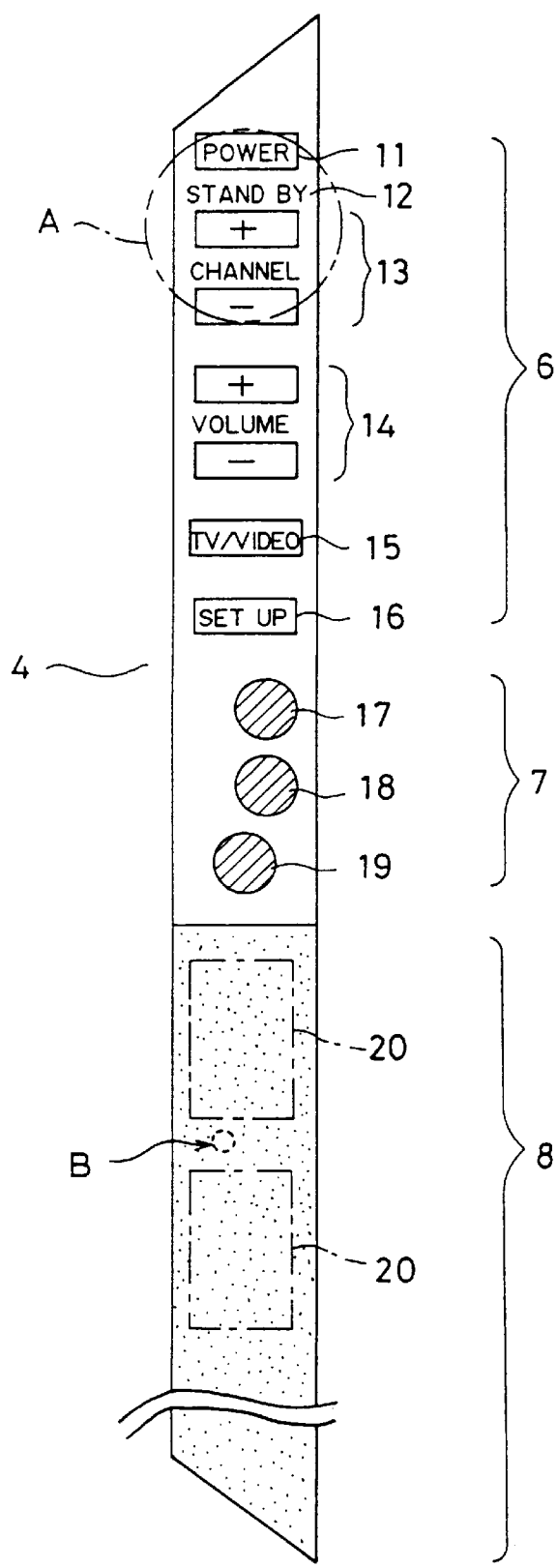
FIG. 2 is a diagram showing the general construction of the panel sheet according to the embodiment of the present invention.

FIG. 2 shows the general construction of the panel sheet 4 attached to the right side face of the television receiver 1.

The panel sheet 4 shown in this figure is formed of a material such as vinyl chloride and the whole sheet has almost the same color as the cabinet 3 of the television receiver 1 (e.g., black) and also an operation unit 6, a filter unit 7, and a sound output unit 8 are provided.

On the operation unit 6 of this panel sheet 4, marking showing the power source on/off switch display unit 11, the stand by display unit 12 to display stand-by condition of the power source, the channel switching switch display unit 13 for selecting channels, the volume control switch display unit 14 to control the sound volume, the TV/video shifting switch display unit 15, and the set-up switch display unit 16 are provided.

The power source on/off switch, channel switching switch, sound volume control switch, TV/video shifting switch, and set-up switch are provided on the cabinet 3 equipped with this panel sheet 4 to correspond to the operation unit 6.

In the filter unit 7, transmission holes which become filter 17 of the remote controller light receiving unit for receiving commands to be outputted from the remote controller, filter 18 of the infrared ray emitting unit for outputting the infrared ray that will be described later, and filter 19 of the infrared ray receiving unit for receiving infrared ray reflection light outputted from the infrared ray emitting unit are provided, and each transmission hole of these filter units is colored purple in order to transmit infrared rays for example.

Thus, by providing the filter unit 7 on the panel sheet 4, the infrared ray emitting device and receiving device can be provided without installing such as a light guiding tubes on the reverse side of this panel sheet 4.

Furthermore, in the sound output unit 8, a number of small holes to be described later are formed, and also opening unit 20 as shown by a chain line which will be described later is formed. This opening unit 20 is formed on the position corresponding to the sound output device provided on the cabinet 3 but not shown in the figure, for example.

The following detailed description deals with the construction of the panel sheet 4.

Figure 3:
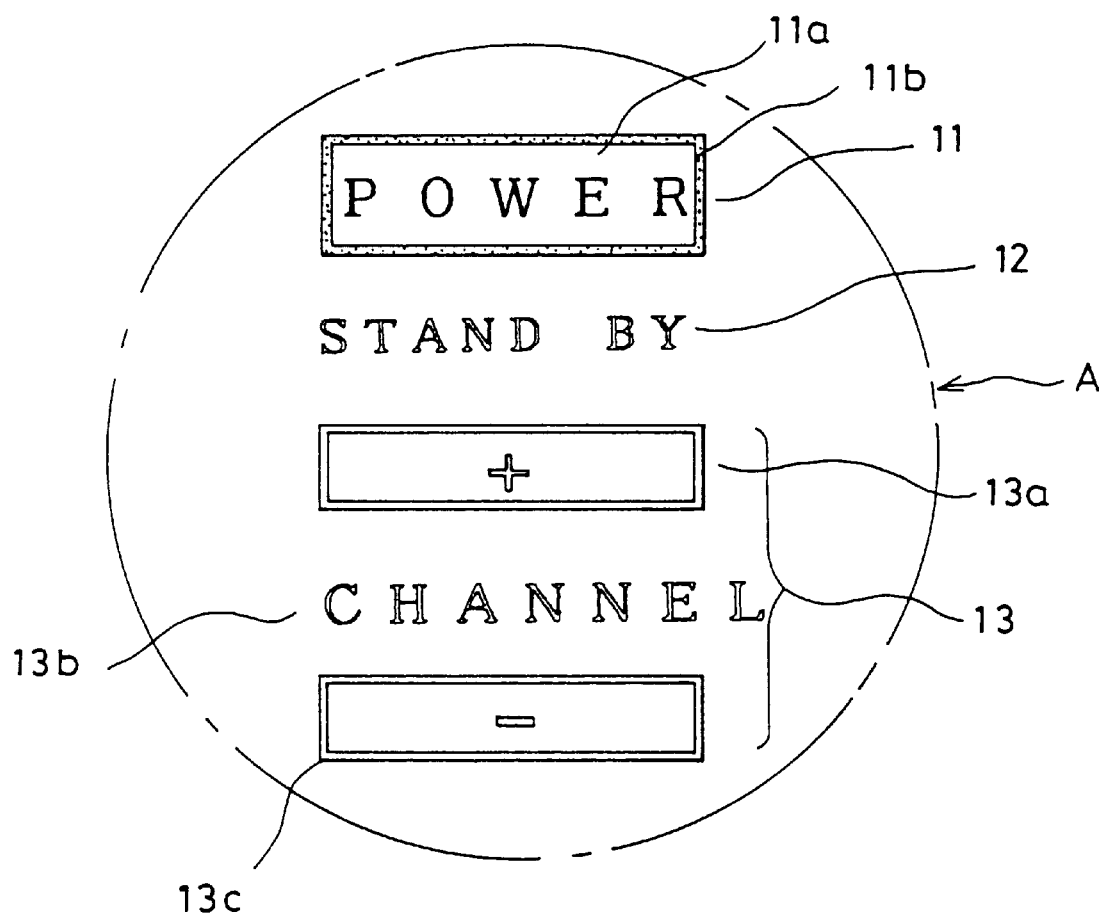
FIG. 3 is an enlarged diagram showing the operation unit shown in a circle of panel sheet A in FIG. 2.

FIG. 3 shows an enlarged operation unit 6 shown in a circle A of the panel sheet 4 in FIG. 2.

As shown in this figure, the on/off switch display unit 11 arranged on the operation unit 6 of the panel sheet 4 comprises character part 11a on which the word "POWER" is written and frame part 11b enclosing the character part 11a, and this character part 11a is displayed for example in green and the frame part 11b is displayed for example in gray.

Moreover, the stand-by display unit 12 on which words "STAND BY" are written is displayed in for example semi-transparent white or gray color.

Furthermore, the channel switch unit display 13 is formed by letter part 13b on which the word "CHANNEL" is written, and channel operation display parts 13a and 13c comprising displays "+", "−" and frames, and these are displayed in semi-transparent white or gray color similar to that of the above.

Volume control switch display unit 14, TV/video shifting switch display 15 and set up switch display unit 16 which are not shown in FIG. 3, are also displayed in semi-transparent white or gray.

Accordingly, if the back is lighted by an LED placed on the position corresponding to the operation unit 6 of the cabinet 3 to be equipped with panel sheet 4, characters and frames such as the stand by display unit 12, channel switch display unit 13 having semi-transparent white or gray color will be displayed lighted up glittering.

Furthermore, since there are cases where the displays of operation unit 6 become an eyesore to the viewer when the user is watching the visual image displayed on the monitor, in the case where the operation unit 6 has not been operated for a fixed period time, the back light is put out thus making displays of the operation unit 6 invisible to the viewer because of semi-transparent white or gray color.

The power source on/off switch unit 11 is constantly displayed.

However, in the case where the user tries to switch channels using the operation unit 6 installed in the apparatus itself, it causes a problem that the user cannot operate the apparatus if the back light of the operation unit 6 is put out and the operation unit 6 can not be seen.

To solve this problem, transmission holes on the infrared ray emitting unit filter 18 and the infrared ray receiving unit filter 19 are provided in the filter unit 7 on the panel sheet 4 in addition to the transmission hole on the remote controller light receiving unit filter 17, and an infrared ray emitting unit is provided on the position corresponding to the filter 18 and an infrared ray receiving unit is provided on the position corresponding to the filter 19.

More specifically, thus providing the infrared ray emitting unit and infrared ray receiving unit, when the user comes closer to the TV set to operate the operation unit 6, an infrared ray signal outputted from the infrared ray emitting unit through the filter 18 is reflected by the user and the infrared ray signal is received at the infrared ray receiving unit through the filter 19, therefore when the user comes closer to the apparatus itself, the back light is lighted up and the operation unit 6 is displayed.

Figure 4:
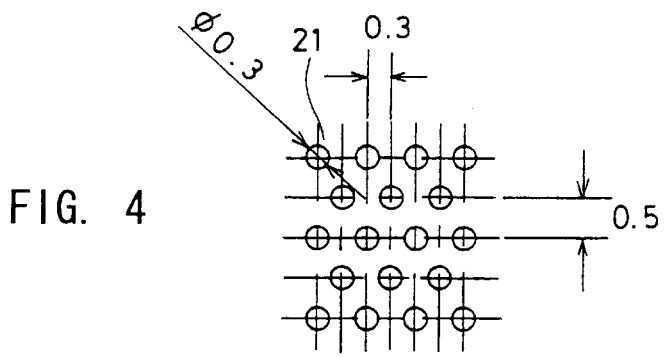
FIG. 4 is an enlarged diagram showing the sound output unit shown in a circle of panel sheet B in FIG. 2.

Then, FIG. 4 is an enlarged diagram of sound output unit 8 shown by B of the panel sheet 4 in FIG. 2. As shown in this figure, a number of small holes, each small hole 21 having 0.3φ, are arranged with the vertical pitch of 0.5 mm and the horizontal pitch of 0.3 mm for example. Moreover, in this sound output unit 8, an opening 20 is provided on the position corresponding to the sound output device as shown in FIG. 2, and only the part of this opening 20 is penetrated by small holes 21.

More specifically, although small holes 21 are provided on the whole part of the sound output unit 8 of the panel sheet 4, only the part of opening unit 20 corresponding to the sound output device is penetrated through from inside to outside by small holes 21 in the panel sheet 4.

With this arrangement, the operation unit 6, the filter unit 7 and the sound output unit 8 are provided on one panel sheet 4, and the panel sheet 4 is attached to the cabinet 3 of the television receiver, and thereby a television set having an integrated design can be realized.

Furthermore, no small holes 21 are provided on the part corresponding to the operation unit 6 and the filter unit 7 of the panel sheet 4 and small holes 21 are provided on the part of sound output unit 8. Therefore, the intensity of operation unit 6 and filter 7 can be maintained and the panel sheet 4 can be protected from the dust, static electricity and water getting in.

Figure 5A:
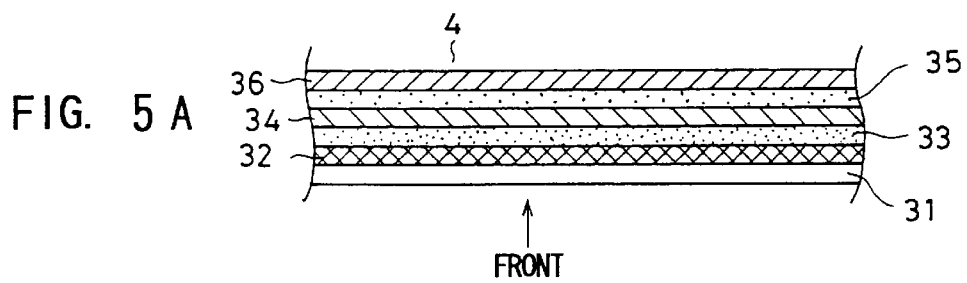
FIGS. 5A to 5C are diagrams showing the typical construction of a panel sheet.

At this point, a manufacturing method of this panel sheet 4 will be described briefly referring to FIGS. 5A to 5C as follows:

FIG. 5A shows a typical manufacturing method of the panel sheet 4.

As shown in this figure, in the panel sheet 4, by applying the prescribed masking processing, black color vinyl chloride layer 32 is formed over the transparent vinyl chloride layer 31. Further, by applying the prescribed masking processing, purple color vinyl chloride layer 33 is formed over the black vinyl chloride layer 32, and by repeating this processing, semi-transparent vinyl chloride layer 34, green vinyl chloride layer 35, and gray vinyl chloride layer 36 are formed.

Figure 5B:
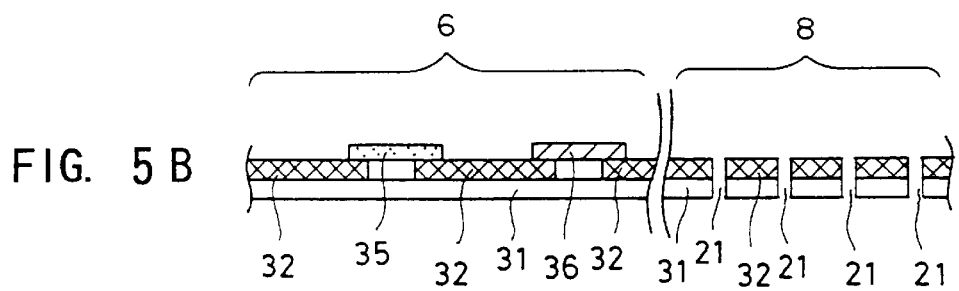

More specifically, the black vinyl chloride layer 32 is not formed on the part corresponding to the character of the power source on/off switch unit 11 by masking processing as shown in FIG. 5B, and such as green vinyl chloride layer 35 is formed on the part on which black vinyl chloride layer 32 is not formed.

Moreover, the same applies to the case of forming the stand by display unit 12, which is semi-transparent, and not forming the black vinyl chloride layer 32 by masking, semi-transparent vinyl chloride layer 36 is formed on this part.

On the other hand, the part corresponding to the sound unit 8 of the panel sheet 4 is formed by transparent vinyl chloride layer 31 and black vinyl chloride layer 32 as seen from FIG. 5B, and at this stage, a number of small holes described above are formed.

Figure 5C:
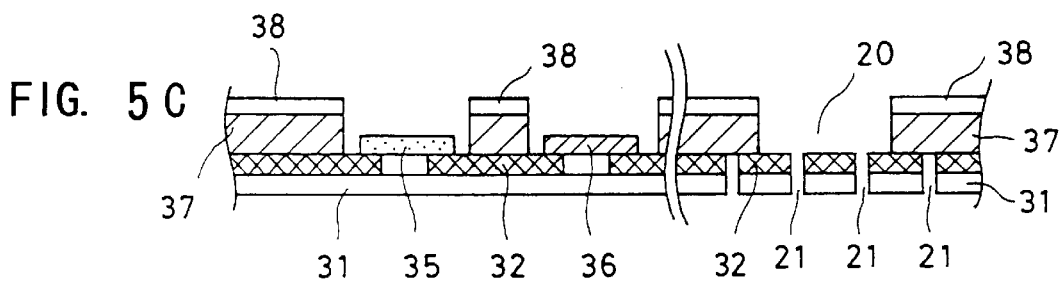

Furthermore, such as black adhesive layer 37 and exfoliation layer 38 is placed over this vinyl chloride layer as shown in FIG. 5C. At this point, if opening 20 is provided on the part corresponding to the sound output device on the adhesive layer 37, the part of panel sheet 4 which is opening unit 20, is penetrated by small holes 21 through, and the part which is not the opening unit 21 is closed by the adhesive layer 37.

The embodiment described above has dealt with the case of providing a number of small holes 21 all over the sound output unit 8 of the panel sheet 4. However, the present invention is not only limited to this, but also small holes 21 can be provided only on the opening unit 20 corresponding to the sound output device for example.

In addition, as well as the display of operation, switches such as power source on/off switch, channel switching switch, sound volume control switch, TV/video shifting switch, and set-up switch can be integratively provided on the operation unit of the panel sheet 4.

According to the television receiver of the present invention as described above, the operation unit, filter unit and sound output unit are provided on the panel sheet and the panel sheet is installed on the front of the cabinet, so that the television receiver with an integrated design can be realized.

Moreover, since no small hole is provided on the parts corresponding to the operation unit and filter unit of the panel sheet, electric apparatus installed inside of the panel sheet can be protected from such as dust, static electricity and moisture.

Furthermore, since an infrared ray sensor device can be provided right inside of the panel sheet, the light guiding tube which was needed before can be eliminated.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A television receiver comprising:

a visual image output unit;

a cabinet including an operation unit, a remote-control light sensor unit, and a sound output device;

a panel sheet including an operation unit cover portion corresponding to said operation unit of said cabinet, an infrared ray transmissive filter portion corresponding to said remote-control light sensor unit of said cabinet, and a sound output portion including a plurality of holes in an area corresponding to said sound output device of said cabinet; wherein said operation unit cover portion, said infrared ray transmissive filter portion, and said sound output portion are integrally formed on said panel sheet; and said remote-control light sensor unit is placed directly behind said infrared ray transmissive filter portion, thereby eliminating the need for light guiding tubes; and said panel sheet is attached to said cabinet;

a back light placed on said cabinet at a position corresponding to a position of said operation unit of said cabinet, wherein said back light turns on for a predetermined period of time after said operation unit has been operated on;

an infrared signal emitting unit for emitting an infrared signal; and an infrared signal receiving unit, wherein said infrared signal emitting unit and said infrared signal receiving unit are placed behind said infrared ray transmissive filter portion; and when a user approaches the television receiver said infrared signal emitted by said infrared signal emitting unit is reflected by the user and received by said infrared signal receiving unit, turning on said back light for said predetermined period of time.

2. The panel control for a television receiver according to claim 1, wherein said operation unit of said panel sheet is formed with marks showing operations of the television receiver illuminated by said back light.

3. The panel control for a television receiver according to claim 1, wherein said panel sheet is made of vinyl chloride.

4. The television receiver according to claim 1, wherein said panel sheet has substantially the same color as a color of said cabinet of the television receiver.

* * * * *